United States Patent [19]

Sivulka

[11] 4,039,227

[45] Aug. 2, 1977

[54] SKID CONTROL SYSTEM HAVING A SWITCHED LOW SPEED NOISE FILTER

[75] Inventor: Gerald Michael Sivulka, Ann Arbor, Mich.

[73] Assignee: Kelsey-Hayes Company, Romulus, Mich.

[21] Appl. No.: 677,824

[22] Filed: Apr. 16, 1976

[51] Int. Cl.² ............................................. B60T 8/08
[52] U.S. Cl. ......................................... 303/97; 303/91; 303/107; 324/161; 361/238
[58] Field of Search ............... 303/91, 95, 97, 106, 303/107; 317/5; 324/160, 161, 162, 168; 340/52 R, 63, 262, 263; 310/68 R

[56] References Cited

U.S. PATENT DOCUMENTS

| 3,727,992 | 4/1973 | Bowler | 303/107 |
| 3,874,741 | 4/1975 | Schnaibel | 303/106 |

Primary Examiner—Trygve M. Blix
Assistant Examiner—Reinhard J. Eisenzopf
Attorney, Agent, or Firm—Harness, Dickey & Pierce

[57] ABSTRACT

A switched noise filter circuit for a skid control system which is adapted to filter out noise signals picked up by the wheel sensors as a result of brake squeal which often occurs at low vehicle speeds. Unfiltered, the sudden termination of a noise signal of this type could be interpreted as a rapid wheel deceleration by the skid control system causing a dumping of the brake pressure, resulting in an inadvertent release of the brakes.

14 Claims, 6 Drawing Figures

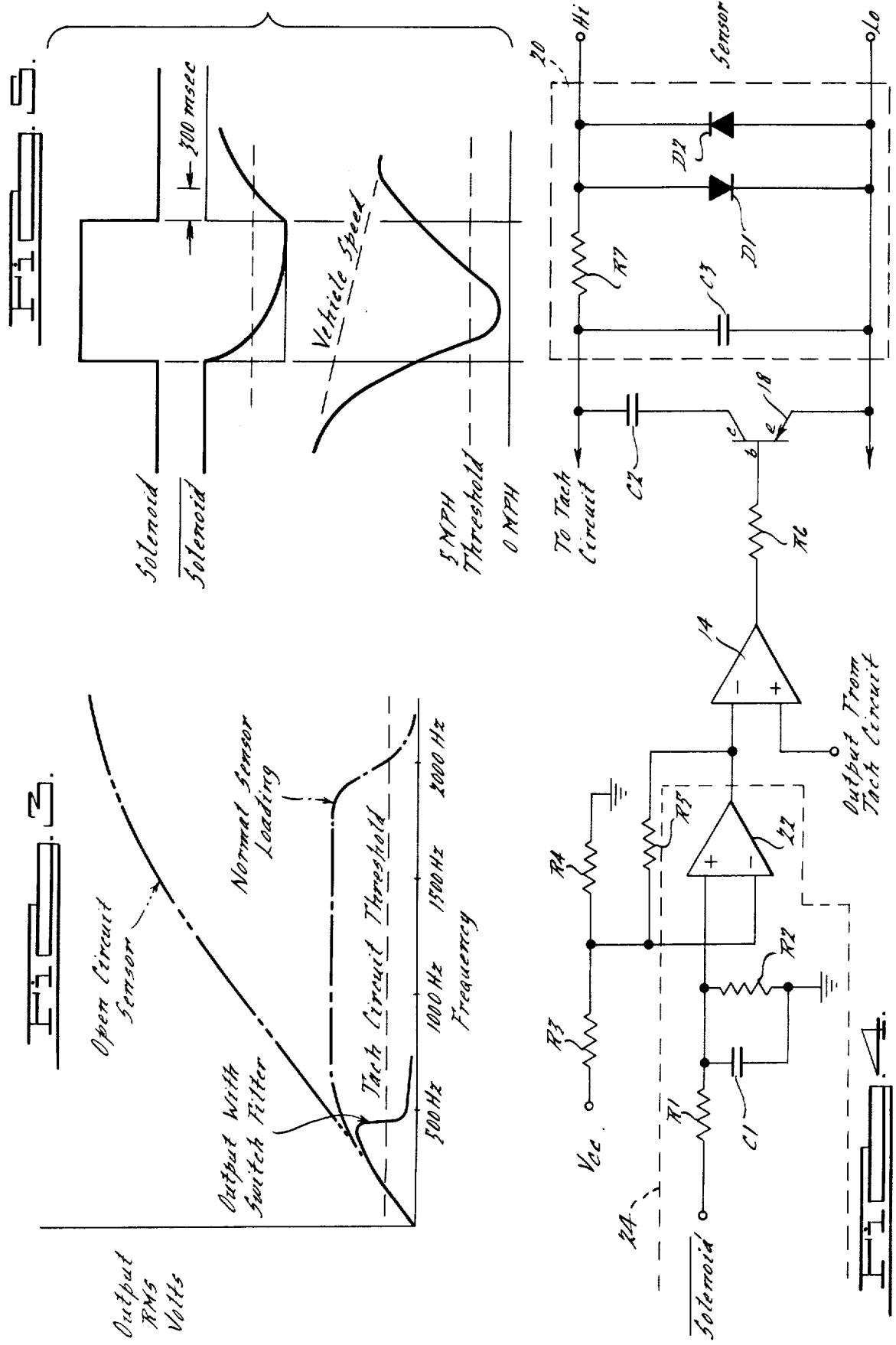

SKID CONTROL SYSTEM HAVING A SWITCHED LOW SPEED NOISE FILTER

BACKGROUND AND SUMMARY OF THE PRESENT INVENTION

Skid control systems currently in use today typically comprise one or more wheel speed sensors coupled to the wheels of a vehicle to monitor the rotational speed of the wheels and produce output signals, the frequencies of which are proportional to the speed of the wheels. These signals are provided to a tach circuit which converts the sensor signal to a d. c. analog signal proportional to the frequency of the signal received at its input. The output from the tach circuit is then supplied to the performance circuit of the skid control system where it is analyzed to determine the existence of an incipient skid condition.

In systems of this type, it has been discovered that, under certain circumstances, it is possible for the tach circuit to erroneously indicate to the performance circuit that a skid condition is present. Specifically, when a vehicle is moving at a slow rate of speed or is stopped on an inclined surface, it is not uncommon for the brakes to emit a relatively loud "squealing" noise as they are gradually applied or released. This is especially true in the case of a large vehicle, such as a truck. When this occurs, the noise causes the wheel sensors to produce an output signal in response thereto that appears to be the tach circuit as a rapid wheel speed acceleration. When the noise terminates, the resulting sudden drop in the sensor output signal is interpreted by the performance circuit as a rapid wheel deceleration, indicating imminent wheel lock-up. The circuit responds, therefore, by releasing the brake pressure, which results in inadvertent loss of the brakes.

Accordingly, it is the primary object of the present invention to prevent the inadvertent release of brake pressure caused by the skid control system responding to brake noise. In general, the present invention incorporates into the skid control system a switched filter circuit which is activated when the vehicle is traveling at speeds below a predetermined rate — e.g. 5 miles per hour — and is adapted to exclude from the tach circuit all signals above a predetermined frequency — e.g. 470 Hz. The circuit operates on the premise that at low speeds no high frequency signals should be present. Therefore, if such a signal is, in fact, present, it is presumed to be noise and is ignored.

The preferred embodiment additionally includes an override circuit for preventing the switched filter circuit from becoming activated during certain periods of operation of the skid control system while in an actual skid condition. This avoids the possibility of the switched filter causing excessive brake release under certain extreme conditions which will be fully explained in the following detailed description of the preferred embodiment.

Other objects and advantages of the present invention will become apparent from a reading of the following detailed description of the preferred embodiment of the present invention which makes reference to the following drawings:

FIG. 3 is a signal diagram illustrating the effect of the switched filter on the wheel sensor signal;

FIG. 4 is a circuit diagram of the switched filter according to the present invention; and FIG. 5 is a graphic illustration of a typical segment of a wheel speed response to a skid condition.

DETAILED DESCRIPTION OF THE PREFERRED EMBODIMENT

Figure 1:
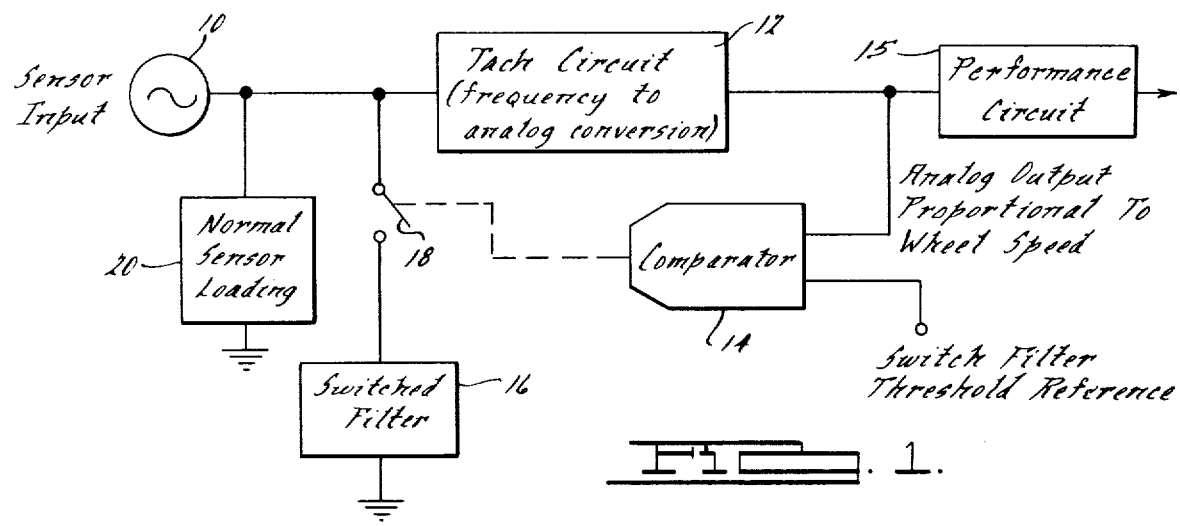
FIG. 1 is a block diagram of the switched filter employed in a skid control system in accordance with the teachings of the present invention.

Referring to FIG. 1, a block diagram of the pertinent sections of a skid control system equipped with a switched filter circuit according to the present invention is shown. As previously explained, skid control systems typically include a wheel speed sensor 10 associated with a wheel of the vehicle, which produces a sinusoidal output signal having a frequency proportional to the rotational speed of the wheel. The output from the sensor 10 is usually provided to a wheel speed signal processing circuit, (hereinafter referred to as a tach circuit 12), which essentially functions as a frequency-to-analog converter. The tach circuit 12 thus produces an analog d.c. output signal which is proportional to the frequency of the sensor signal. Therefore, it can be seen that the analog output signal from the tach circuit 12 is proportional to the rotational speed of the wheel. Additionally, the output from sensor 10 is typically tied to a loading circuit 20 which maintains the output voltage from sensor 10 within permissible levels so as not to overload tach circuit 12. The analog output signal from the tach circuit 12 is then provided to the performance circuit 15 which analyzes the tach signal to determine the existence of a skid condition. Performance circuits of the type contemplated by the present invention are disclosed in the pending applications of Roger S. Miller, Ser. No. 482,449, filed June 24, 1974, entitled "Skid Control System", abandoned in favor of application Ser. No. 648,786 filed Jan. 13, 1976, and Thomas M. Atkins, Ser. No. 523,426, filed Nov. 13, 1974, entitled "Skid Control System", now U.S. Pat. No. 3,966,266 issued June 29, 1976.

Figure 2A:
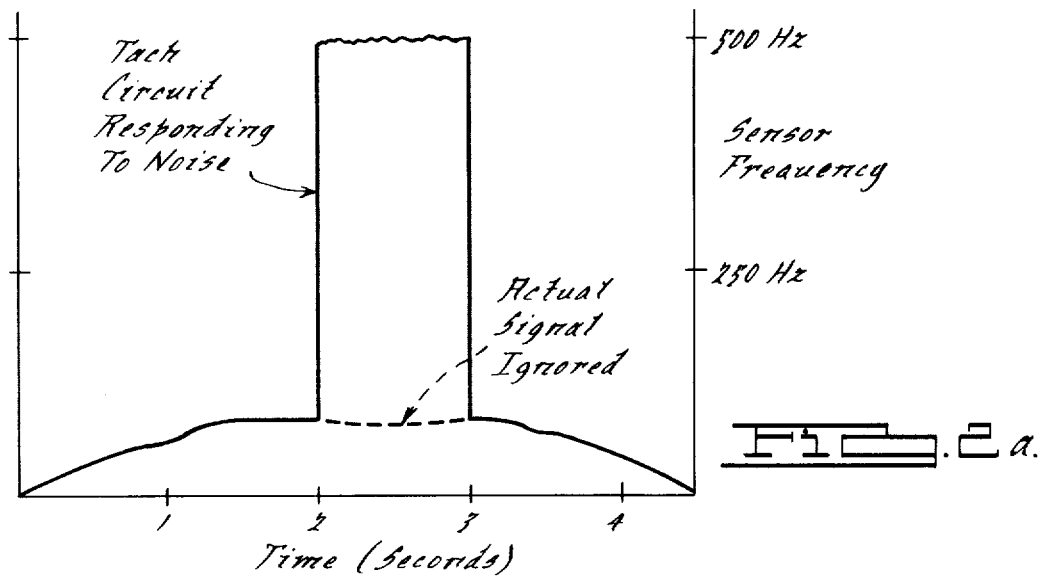
FIGS. 2a and 2b are signal diagrams illustrating the effect of the switched filter on the tach circuit output.

It has been observed that conventional skid control systems of the type described will inadvertently release brake pressure under certain circumstances which can best be explained by the following illustration. Referring to FIG. 2a, assume, for example, that a vehicle, and in particular a heavy vehicle such as a truck, is braked while on an inclined road surface, and the brakes are gradually released. As the truck begins to slowly move down the incline, the brake will typically begin to squeal, generating noise at a frequency of approximately 500 Hz. This noise is picked up by the wheel speed sensors and is interpreted by the tach circuit 12 as a legitimate sensor signal. Thus, according to the tach circuit output, the truck appears to have rapidly accelerated to a speed of approximately 30 miles per hour, as shown. When the brake squeal stops, the sensor signal decreases rapidly to its original level, causing a similar dramatic drop in the output from the tach circuit 12. This sudden drop in the output from the tach circuit 12 is interpreted by the performance circuit 15 as a rapid deceleration in the speed of the wheel, indicating that a skid condition is imminent. Accordingly, the performance circuit releases the brake pressure on the wheels which results in a momentary loss of brakes and the truck beginning to roll down the hill. Since certain skid control systems for multi-axle trucks consider the speed of the fastest wheel to be indicative of the speed of the vehicle, this phenomena can create problems even when the brakes on only one wheel, or one axle, of the vehicle generate the brake noise.

Figure 2B:
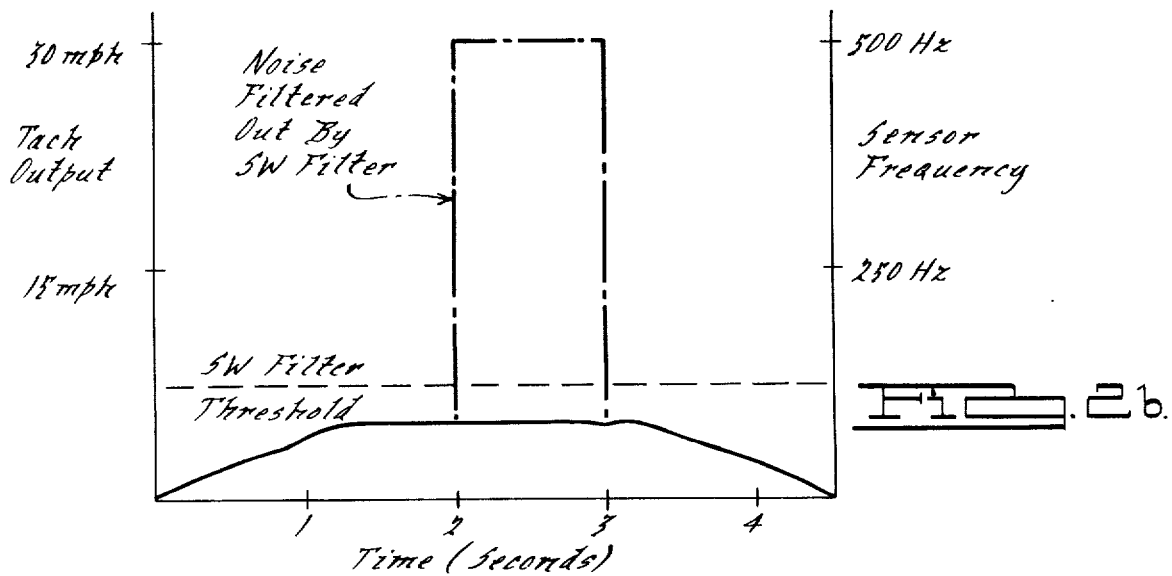

The present invention seeks to avoid the effect of brake noise on the skid control system by providing a switched filter that is activated whenever the speed of the vehicle falls below a predetermined threshold (e.g. 5 miles per hour). When activated, the switched filter excludes from the tach circuit 12 signals above a predetermined frequency (e.g. 470 Hz). Thus, given the same example outlined above and a skid control system including a switched noise filter according to the present invention, the output signal from the tach circuit 12 would appear as illustrated in FIG. 2b, with the brake noise signal filtered out, leaving the actual wheel speed signal substantially intact.

Returning to FIG. 1, the basic skid control system is modified according to the present invention by connecting the output from the tach circuit 12 to one of the inputs to a comparator circuit 14. Supplied to the other input of comparator 14 is a fixed bias voltage representing the switched filter threshold reference value. The output from comparator 14 is connected to the enabling terminal of an electronic switching device 18. The switched filter circuit 16 is connected between ground potential and one side of the electronic switching device 18, and the other side of the switching device 18 is tied to the output from the wheel sensor 10.

In operation, the switching device 18 is adapted to switch the switched filter circuit 16 either into or out of the system in accordance with the status of the output signal from comparator 14. Specifically, starting with a vehicle speed of zero miles per hour, the analog output signal from tach circuit 12 will be less than the switched filter threshold reference value. Therefore, the comparator 14 will produce a negative output signal which closes switching device 18, thereby switching into the circuit switched filter 16. As the speed of the vehicle increases, the analog output signal from tach circuit 12 increases accordingly, until the condition is reached wherein the wheel speed signal from tach circuit 12 exceeds the switched filter threshold reference value. In the preferred embodiment, the threshold reference value is selected to correspond to a vehicle speed of approximately 5 miles per hour. Thus, when the wheel speed signal exceeds a value equivalent to a vehicle speed of roughly 5 miles per hour, the output signal from comparator 14 goes to zero or ground potential, thereby opening switching device 18 and disconnecting the switched filter 16 from the circuit. The switched filter 16 will remain switched out of the circuit until the wheel speed signal from tach circuit 12 once again falls below the threshold reference value.

Referring to FIG. 4, a circuit diagram of the relevant sections of a skid control system incorporating the switched filter concept of the present invention is shown. The output from the sensor (not shown) is connected to the sensor loading circuit 20, comprising limiting diodes D1 and D2, capacitor C3 and resistor R7. As previously explained, the sensor loading circuit 20 limits the voltage level of the output signal from the sensor so as not to overload the tach circuit (not shown). The H1 output from the sensor loading circuit 20 is tied to one end of a filter capacitor C2. The other end of the filter capacitor C2 is connected to the collector terminal of a PNP switching transistor 18. The emitter of the transistor 18 is tied to the LO output terminal of the sensor, which corresponds to a potential of approximately 3 volts. The base terminal of transistor 18 is connected through resistor R6 to the output of a comparator amplifier 14. The output from the tach circuit (not shown) is supplied to the positive input of comparator 14, and the negative input is connected through resistor R5 to the midpoint of a voltage divider network comprised of resistors R3 and R4. The values of resistors R3 and R4 are selected so that the fixed bias threshold value supplied to the negative input terminal of comparator 14 will correspond to an analog vehicle speed of approximately 5 miles per hour. The 5 miles per hour value has been chosen because it has been found that it is below this speed that brake noise most frequently occurs. Comparator amplifier 14 is an open collector device which grounds the output signal when the signal at its negative input exceeds the signal at its positive input, and effectively provides an open circuit when the signal at its positive input exceeds the signal at its negative input. Thus, it becomes apparent that for analog wheel speed signals from the tach circuit below the bias threshold value, the comparator 14 will ground the output signal, thereby providing the necessary bias at the base of transistor 18 to render the transistor 18 conductive. With transistor 18 conducting, capacitor C2 effectively acts as a short circuit for high frequency sensor signals.

In addition, when the analog output signal from the tach circuit exceed the bias threshold value supplied to the negative input of comparator 14, the comparator 14 will cease conducting current. With the negative bias removed from transistor 18, the transistor 18 is rendered non-conductive, and the capacitor C2 is switched out of the circuit, thereby permitting the sensor signals to pass unfiltered to the tach circuit. Thus, it becomes apparent that the switched filter is operative to exclude high frequency noise signals from the tach circuit only when the vehicle is moving at a speed less than 5 miles per hour.

It should be noted at this point that the tach circuits typically employed in skid control systems are adapted to respond only to sensor signals above a predetermined voltage level. An example of such a circuit can be found in U.S. Pat. Nos. 3,578,819 and 3,870,376. Looking to FIG. 3, this voltage level is illustrated by a dashed line and is referred to as the tach circuit threshold. The purpose of this feature is to prevent the tach circuit from responding to small spurious noise signals which may be picked up by the wheel sensors. As the signal diagram in FIG. 3 illustrates, the switched filter of the present invention effectively excludes high frequency sensor signals from the tach circuit by attenuating the voltage level of these signals below the tach circuit threshold. Thus, it can be seen that although the lower frequency sensor signals are also attenuated to a certain extent by the switched filter, it is only those sensor signals having a frequency above approximately 470 Hz that are attenuated to a voltage level below the tach circuit threshold. Therefore, it is only those sensor signals above 470 Hz which the tach circuit will ignore when the switched filter is connected in the circuit. The 470 Hz level has been selected because it has been found that the noise which effects the sensor during brake squeal typically occurs at a frequency of around 500 Hz.

Returning to the circuit diagram of FIG. 4, the preferred embodiment includes additional override circuitry 24 to prevent the switched filter from having a possible adverse effect on the normal operation of the skid control system during an actual skid condition. Although I am not the sole inventor of the override circuitry 24, a disclosure of the circuit is included in the preferred embodiment of the present invention but not claimed in this application because it was devised with others subsequent to my invention but prior to the filing of the present application and, therefore, presently constitutes part of the best mode contemplated of carrying out my invention.

As is well known to those skilled in the skid control art, the frequency to analog conversion operation performed by the tach circuit consumes a certain amount of time which is dependent upon the frequency of the sensor signal. At a speed of 30 miles per hour, this time period is equal to approximately 10 milliseconds. Consequently, the tach circuit introduces a 10 millisecond time delay between the wheel speed sensor signal and the corresponding analog tach signal. It is this inherent delay in the reaction time of the tach circuit which can lead to the possible faulty operation of the system.

Returning to FIG. 3, it will be recalled that the switched filter attenuates sensor signals above 470 Hz to a voltage level below the tach circuit threshold when the output from the tach circuit is less than the switched filter threshold reference value (which corresponds to a wheel speed of approximately 5 miles per hour.) Accordingly, it can be seen that during extremely fast wheel acceleration it is possible for the sensor output signal to exceed the 470 Hz frequency level before the analog output signal from the tach circuit has had an opportunity to exceed the switched filter threshold reference value. Should this occur, the output from the tach circuit would be "locked" to zero, which would keep the filter switched in, even though the sensor signal indicates an accelerating wheel speed greater than 5 miles per hour. With the filter switched in, the increasing wheel speed signals from the sensor would be ignored by the system, thereby resulting in a complete loss of the brakes while the skid control system "waits" for the speed of the wheel to accelerate up to vehicle speed. However, for this to happen it would be necessary for the wheel of the vehicle to accelerate from a speed below 5 miles per hour to a speed of almost 30 miles per hour within the approximately 10 milliseconds reaction time of the tach circuit. This type of acceleration is, of course, impossible under normal vehicle operation. However, during a skid condition on a high mu surface, it is possible to duplicate this kind of wheel speed acceleration between successive brake applications.

Referring to FIG. 5, a typical segment of a wheel speed diagram during a skid condition is illustrated. As can be seen, the speed of the wheel initially decelerates when the brakes are applied, and then begins to accelerate upon brake release. (Brake release corresponding to the presence of a solenoid pulse which is operative to dump brake pressure.) It is during the time period immediately following brake pressure dump that extremely high wheel acceleration rates are possible. Therefore, it is conceivable that the situation could arise wherein a vehicle that has entered into a skid condition, and has experienced a large wheel speed departure from vehicle speed resulting in a drop in wheel speed below 5 miles per hour followed by a rapid brake pressure dump producing an extremely fast wheel speed acceleration, will lose total control of the brakes.

To avoid the possibility of this occurring under the extreme conditions outlined, it becomes necessary to provide some type of override circuitry 24 to prevent the switched filter from switching into the circuit during a skid condition when an extreme wheel departure drops the speed of the wheel below 5 miles per hour. In the preferred embodiment, this is accomplished by providing an additional comparator amplifier 22 having its positive input connected through resistor R1 to the inverse of the solenoid signal ($\overline{\text{SOLENOID}}$), and its negative input tied to the midpoint of the voltage divider network comprised of resistors R3 and R4. The output from the comparator 22 is provided to the negative input of comparator 14. Comparator amplifier 22 is also an open collector device having the same operating characteristics as comparator 14. Thus, it can be seen that when the $\overline{\text{SOLENOID}}$ signal goes low, the potential at the negative input of comparator 22 will exceed the potential at its positive input, thereby grounding the output of comparator 22. With the output from comparator 22 at ground potential, the negative input terminal of comparator 14 is similarly pulled to ground, thereby rendering comparator 14 nonconductive. This, in turn, removes the negative bias from the base of transistor 18, which makes transistor 18 nonconductive and removes the switched filter from the circuit. Thus, it becomes apparent that the switched filter will be disconnected from the circuit whenever a SOLENOID signal is present (which corresponds to brake release during a skid condition.)

Additionally, it will be noted that a time delay network comprised of a capacitor C1 and resistor R2, is provided between the $\overline{\text{SOLENOID}}$ terminal and the positive input to comparator 22. In addition to providing transient protection for the comparator 22, the time delay network introduces approximately a 300 millisecond delay into the response time of the comparator 22 to the termination of the SOLENOID signal pulse. More specifically, it can be seen from the signal diagram in FIG. 5, that the time delay circuit causes the signal from the $\overline{\text{SOLENOID}}$ terminal to increase gradually rather than abruptly. This, of course, creates a delay between the termination of the SOLENOID signal and that point in time wherein the signal at the positive input to comparator 22 exceeds the bias threshold level provided to the negative input of comparator 22. This time delay insures that the switched filter will remain disconnected from the system for the duration of the period in which maximum wheel acceleration can occur. Thus, it can be seen that the override provision of the circuit 24 prevents the switched filter from being switched into the system during those intervals corresponding substantially to the duration of each SOLENOID pulse delayed by a time period of approximately 300 milliseconds. It is to be understood, however, that the SOLENOID signal will only be present when the brakes are released during a skid condition. Therefore, under normal vehicle operation, the switched filter will be activated whenever the speed of the wheel falls below 5 miles per hour.

Having thus described the invention, what is claimed is:

1. In a vehicle equipped with a skid control system having at least one wheel speed sensor operatively associated with one of the wheels of said vehicle to produce an output signal whose frequency is proportional to the rotational speed of said one wheel, and wheel speed signal processing means adapted to receive said sensor output signal and provide a signal at its output proportional to the frequency of said sensor signal; switched filter means for excluding from said signal processing means sensor output signals above a predetermined frequency whenever the output signal from said signal processing means does not exceed a predetermined threshold value.

2. The skid control system of claim 1 wherein said switched filter means includes comparator means adapted to receive the output signal from said signal processing means and provide a signal at its output whenever the output signal from said signal processing means does not exceed said predetermined threshold value.

3. The skid control system of claim 2 wherein said switched filter means further includes filtering means connected between said sensor means and said signal processing means, and adapted to filter sensor signals above said predetermined frequency.

4. The skid control system of claim 3 wherein said switched filter means further includes switching means connecting said filtering means to the output of said sensor, and adapted to open the connection between said filtering means and the output of said sensor whenever said output signal from said comparator means is not provided.

5. The skid control system of claim 4 wherein said switching means comprises a transistor having its base terminal connected to the output from said comparator means and its collector - to - emitter path providing said connection between said filtering means and the output of said sensor means.

6. The skid control system of claim 1 wherein said signal processing means is further adapted to respond only to signals from said sensor above a predetermined amplitude threshold.

7. The skid control system of claim 6 wherein said switched filter means is adapted to attenuate the amplitude of signals from said sensor having a frequency above said predetermined frequency to a level below said predetermined amplitude threshold.

8. The skid control system of claim 1 wherein said predetermined frequency is equal to approximately 470 Hz.

9. The skid control system of claim 1 wherein said predetermined threshold value is equivalent to an output signal from said signal processing means corresponding to a wheel speed of approximately 5 miles per hour.

10. A skid control system for a vehicle comprising:
at least one wheel speed sensor operatively associated with one of the wheels of said vehicle to produce an output signal whose frequency is proportional to the rotational speed of said one wheel;
a performance circuit adapted to receive and analyze said sensor signal to determine the existence of an incipient skid condition, and further adapted to produce an output signal which is operative to release the pressure on the brakes of said wheel; and
means for preventing said performance circuit from producing said output signal in response to noise signals generated by the brakes of said wheel only when said vehicle is moving at a speed slower than a predetermined rate.

11. The skid control system of claim 10 wherein said predetermined rate is approximately equal to 5 miles per hour.

12. A skid control system for a vehicle comprising:
at least one wheel speed sensor operatively associated with one of the wheels of said vehicle to produce an output signal whose frequency is proportional to the rotational speed of said one wheel;
wheel speed signal processing means adapted to receive said sensor output signal and provide a signal at its output proportional to the frequency of said sensor output signal; and
switched filter means connected to the output of said signal processing means and including filtering means for filtering signals above a predetermined frequency, said switched filter means being operative to switch said filtering means into the circuit connection between said sensor and said signal processing means whenever the output signal from said signal processing means does not exceed a predetermined threshold value.

13. The skid control system of claim 12 wherein said predetermined frequency is equal to approximately 470 Hz.

14. The skid control system of claim 12 wherein said predetermined threshold value is equivalent to an output signal from said signal processing means corresponding to a wheel speed of approximately 5 miles per hour.

* * * * *